(12) United States Patent
Sonobe

(10) Patent No.: US 7,502,905 B2
(45) Date of Patent: Mar. 10, 2009

(54) STORAGE CONTROL METHOD, PROGRAM AND APPARATUS FOR ACCESSING DISK ARRAY

(75) Inventor: Satoshi Sonobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 11/214,838

(22) Filed: Aug. 31, 2005

(65) Prior Publication Data

US 2006/0259686 A1 Nov. 16, 2006

(30) Foreign Application Priority Data

May 13, 2005 (JP) ............................. 2005-140780

(51) Int. Cl.
*G06F 13/00* (2006.01)
(52) U.S. Cl. ...................... 711/170; 711/114
(58) Field of Classification Search ................ 711/114, 711/170
See application file for complete search history.

(56) References Cited

U.S. PATENT DOCUMENTS

| | | | | |
|---|---|---|---|---|
| 6,058,489 A | * | 5/2000 | Schultz et al. ................. 714/7 |
| 6,275,898 B1 | * | 8/2001 | DeKoning ................... 711/114 |
| 7,111,147 B1 | * | 9/2006 | Strange et al. .............. 711/209 |
| 7,185,144 B2 | * | 2/2007 | Corbett et al. .............. 711/114 |
| 2003/0120864 A1 | * | 6/2003 | Lee et al. ..................... 711/114 |
| 2003/0157896 A1 | * | 8/2003 | Mee et al. .................. 455/67.1 |
| 2007/0055820 A1 | * | 3/2007 | Eguchi et al. ............... 711/114 |

FOREIGN PATENT DOCUMENTS

| | | |
|---|---|---|
| JP | 2000-39970 | 2/2000 |
| JP | 2000-293320 | * 10/2000 |

\* cited by examiner

*Primary Examiner*—Reba I Elmore
(74) *Attorney, Agent, or Firm*—Staas & Halsey LLP

(57) ABSTRACT

Based on an input/output request from a server, a volume formed of a plurality of disk apparatuses having a RAID (Redundant Arrays of Inexpensive Disks) configuration is accessed. A performance measuring unit periodically measures the performance of the plurality of disk apparatuses during apparatus operation, and a performance-measurement-value storage unit stores a performance measurement value obtained through measurement. When the performance is determined from the performance measurement value as having been deteriorated, a performance improving unit adds a disk apparatus to increase the size of the volume. Also, the performance improving unit sets a performance threshold for each of performance measurement values of a plurality of types and, when at least any one of the performance measurement values falls below a corresponding performance threshold, adds a disk apparatus.

20 Claims, 16 Drawing Sheets

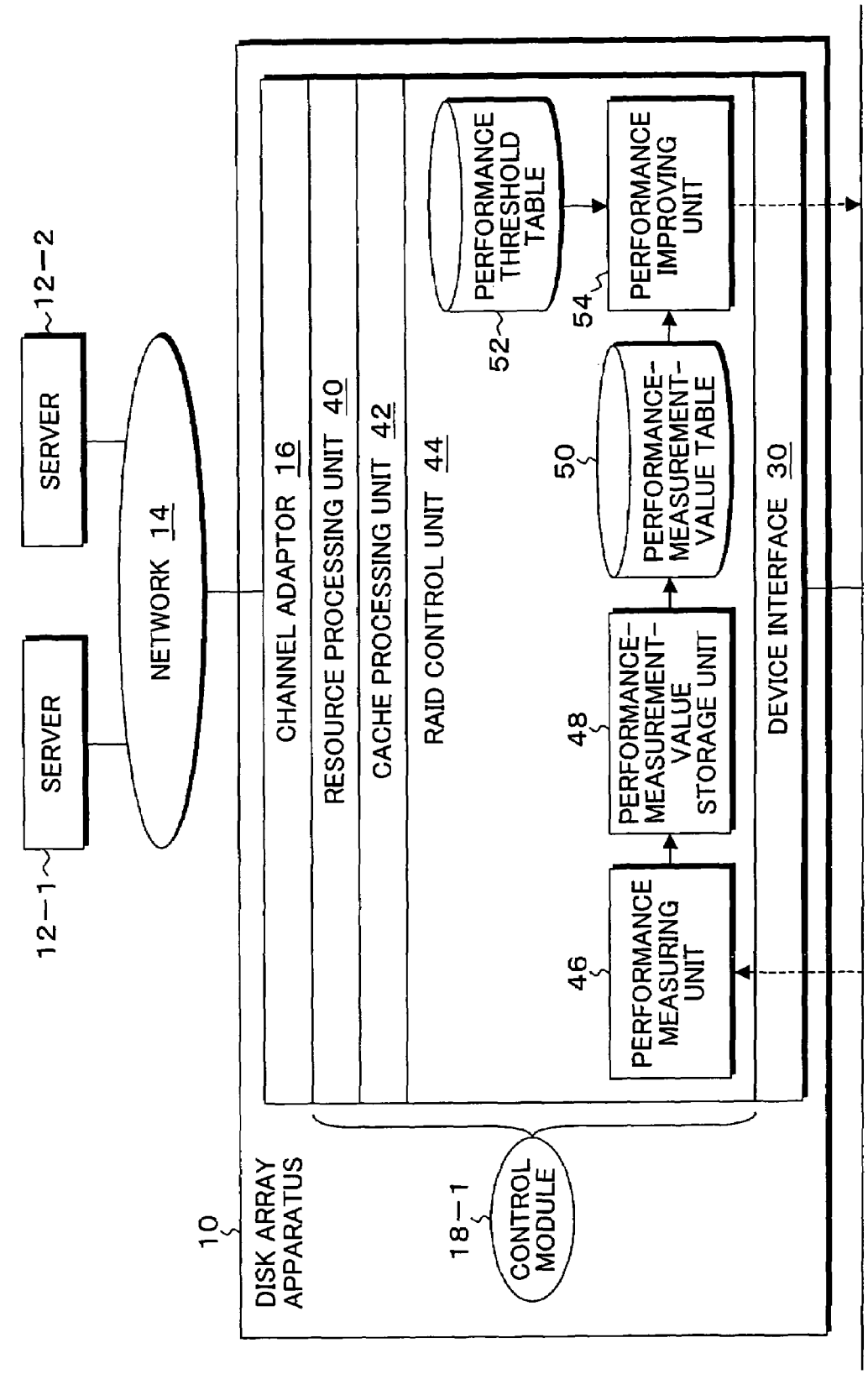

FIG. 3

| DISK APPARATUS | PERFORMANCE MEASUREMENT VALUE | | | | | |
|---|---|---|---|---|---|---|
| | READ/WRITE PERFORMANCE (MB/s) 56 | RESPONSE TIME (ms) 58 | SEEK TIME (ms) 60 | ROTATION LATENCY TIME (ms) 62 | THE NUMBER OF TIMES OF ERROR 64 | FREE SPACE (MB) 66 |
| 36-1 | A1 | B1 | C1 | D1 | E1 | F1 |
| 36-2 | A2 | B2 | C2 | D2 | E2 | F2 |
| 36-3 | A3 | B3 | C3 | D3 | E3 | F3 |

| READ/WRITE PERFORMANCE | RESPONSE TIME | SEEK TIME | ROTATION LATENCY TIME | THE NUMBER OF TIMES OF ERROR | FREE SPACE |
|---|---|---|---|---|---|
| TH[A1] | TH[B1] | TH[C1] | TH[D1] | TH[E1] | TH[F1] |

MINIMUM PERFORMANCE THRESHOLD

FIG. 4B 52-2

| READ/WRITE PERFORMANCE | RESPONSE TIME | SEEK TIME | ROTATION LATENCY TIME | THE NUMBER OF TIMES OF ERROR | FREE SPACE |
|---|---|---|---|---|---|
| TH[A2] | TH[B2] | TH[C2] | TH[D2] | TH[E2] | TH[F2] |

RELATIVE PERFORMANCE THRESHOLD

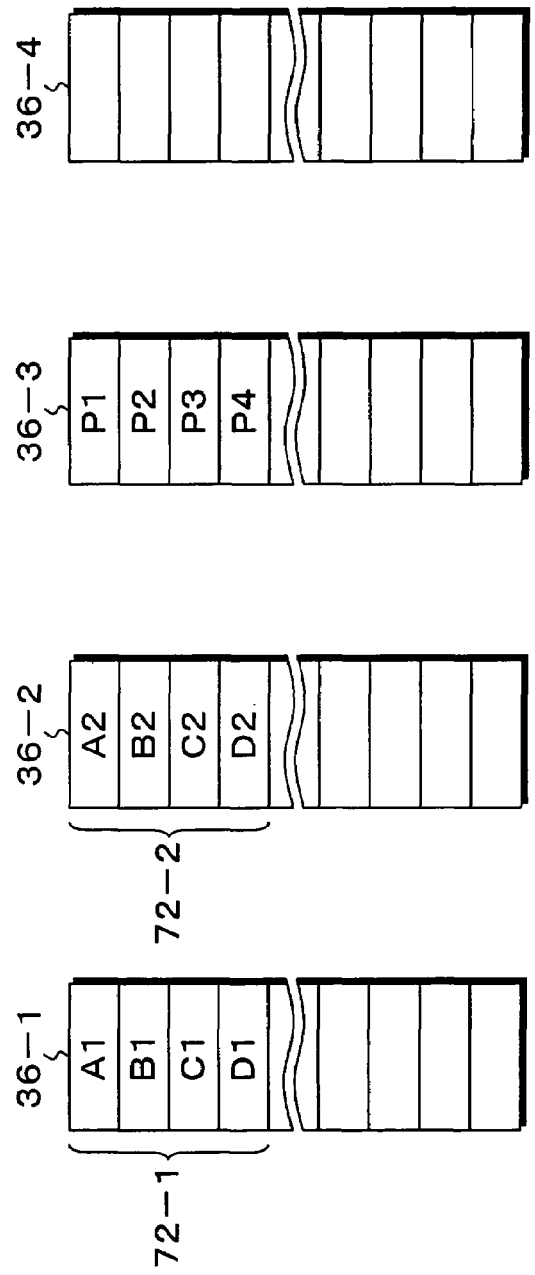
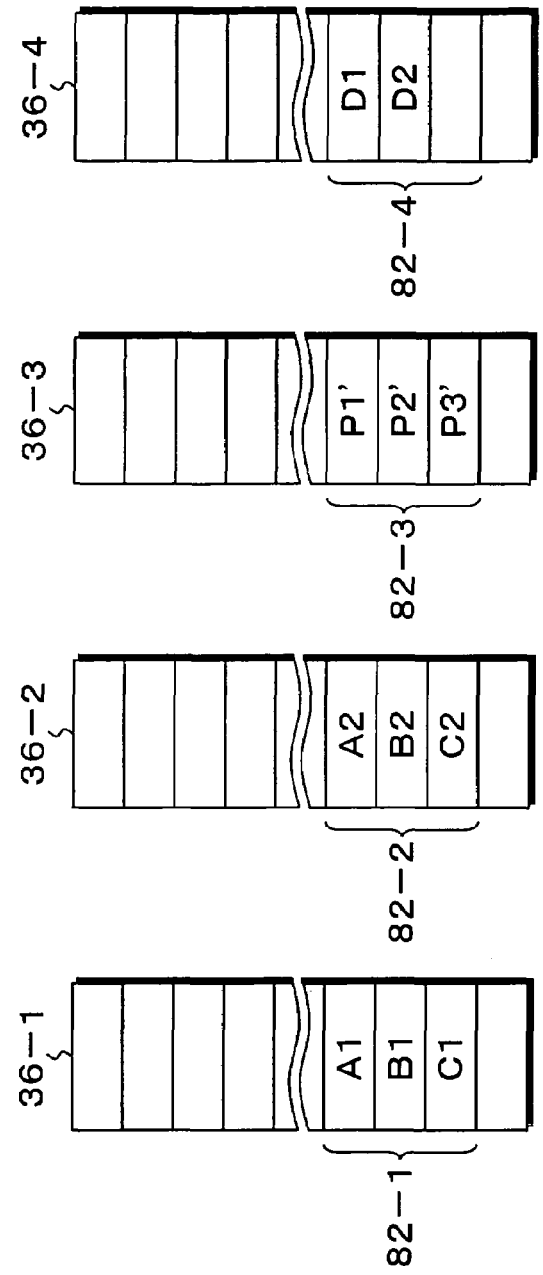
FIG. 14A
FIG. 14B

STORAGE CONTROL METHOD, PROGRAM AND APPARATUS FOR ACCESSING DISK ARRAY

This application is a priority based on prior application No. JP 2005-140780, filed May 13, 2005, in Japan.

BACKGROUND OF THE INVENTION

1. Field of the Invention

The present invention relates to a storage control method, program, and apparatus that accesses, based on an input/output request from an upper apparatus, such as a server, a volume formed as a disk array from a plurality of storage devices having a RAID configuration and, particularly to a storage control method, program, and apparatus that monitors a deterioration in processing performance during operation and performs automatic recovery.

2. Description of the Related Arts

Conventionally, a disk array apparatus connected to a server on a network has been known as a storage area network (SAN) or a network attached storage (NAS). Such a disk array apparatus ensures high reliability by providing redundancy by a RAID (Redundant Arrays of Inexpensive Disks) configuration with a plurality of magnetic disk apparatuses being taken as storage devices so as to increase input/output performance and, at the same time, to allow recovery even if data loss occurs due to apparatus malfunction or the like.

[Patent Document 1] Japanese Patent Laid-Open Publication No. 2000-039970

[Patent Document 2] Japanese Patent Laid-Open Publication No. 2000-293320

However, in such a disk array apparatus used as a network storage, many magnetic disk apparatuses are used as storage devices, all of which are basically ensured the same performance, but actually individual magnetic disk apparatuses have variations in performance to some extent. The performance of a particular magnetic disk apparatus may not cause a failure but may be deteriorated more than that of other magnetic disk apparatuses. It is not until a report from a user of the system who has noticed a delay in processing time at a client or server that troubleshooting for investigating and handling a cause for deterioration in performance is started. In such a case, possible causes for deterioration in performance are wide-ranging other than the disk array apparatus, such as a server or client on the network. In troubleshooting, all of such possible causes in that range are isolated from each other one by one. Even if a particular magnetic disk apparatus provided in the disk array apparatus is the cause for deterioration in performance, this poses a problem such that it takes a lot of time and trouble until that magnetic disk apparatus is found to be the cause and then the trouble is solved. According to the present invention to provide a storage control method, program, and apparatus that monitors the performance of the entire volume formed of a plurality of storage devices, such as disk apparatuses, and automatically recovers the performance when the performance is determined as having been deteriorated.

SUMMARY OF THE INVENTION

The present invention provides a storage control method of accessing a volume formed of a plurality of storage devices having a RAID configuration. That is, the storage control method according to the present invention includes:

a performance measuring step of periodically measuring performance of a plurality of storage devices while an apparatus is movable;

a performance-measurement-value storing step of storing a performance measurement value obtained through measurement in the performance measuring step; and a performance improving step of increasing a size of the volume by adding a storage device when the performance is determined from the performance measurement value in the performance-measurement-value storing step as having been deteriorated.

Here, in the performance measuring step, performances of a plurality of types in the storage devices are measured, in the performance-measurement-value storing step, performance measurement values of the plurality of types obtained through measurement in the performance measuring step are stored, and in the performance improving step, a performance threshold is set for each of the performance measurement values of the plurality of types, and the size of the volume is increased by adding a storage device when at least any one of the performance measurement values falls below a corresponding performance threshold.

For example, the storage devices are disk apparatuses that read and write data from and to a disk medium, and the performance measurement values of the disk apparatuses include any one or combination of:

(1) a read/write performance represented by a data transfer amount per unit time;

(2) a response time from reception of a command until an end response;

(3) a seek time from reception of a command to a movement of a head to a target track and then on-track;

(4) a rotation latency time of the disk from the on-track on the target track until a target sector's appearance on the head; and (5) the number of times of errors within a predetermined period of time and a free space.

In the performance improving step, a minimum performance threshold value is set in advance so as to correspond to the performance measurement value, and the size of the volume is increased by adding a storage device when the performance measurement value is equal to or smaller than the minimum performance threshold.

In the performance improving step, a relative performance threshold is found by multiplying an average value of the plurality of performance measurement values of the storage devices by a relative performance rate, and the size of the volume is increased by adding a storage device when the performance measurement value is equal to or smaller than the relative performance threshold.

In the performance improving step, when a storage device is added, one step of data written in an existing storage device is relocated to the additional storage device.

In the performance improving step, when a storage device is added, one step of data written in an existing storage device is relocated to the additional storage device and the existing storage device.

The present invention provides a program to be executed by a computer of a storage control apparatus that accesses, based on an input/output request from an upper apparatus, a volume formed of a plurality of storage devices having a RAID configuration. That is, the program according to the present invention causes the computer of the storage control apparatus to execute steps including:

a performance measuring step of periodically measuring performance of the plurality of storage devices during the apparatus operation;

a performance-measurement-value storing step of storing a performance measurement value obtained through measurement in the performance measuring step; and a performance improving step of increasing a size of the volume by adding a storage device when the performance is determined from the performance measurement value in the performance-measurement-value storing step as having been deteriorated.

The present invention provides a storage control apparatus that accesses, based on an input/output request from an upper apparatus, a volume formed of a plurality of storage devices having a RAID configuration.

That is, the storage control apparatus according to the present invention includes:

a performance measuring unit that periodically measures performance of the plurality of storage devices during the apparatus operation;

a performance-measurement-value storage unit that stores a performance measurement value obtained through measurement by the performance measuring unit; and a performance improving unit that increases a size of the volume by adding a storage device when the performance is determined from the performance measurement value of the performance-measurement-value storage unit as having been deteriorated.

Here, details of the program and the storage control apparatus according to the present invention are basically identical to those of the storage control method according to the present invention.

According to the present invention, individual performances of a plurality of storage devices, for example, disk apparatuses, forming a volume are periodically measured during the apparatus operation to monitor a deterioration in performance. When the performance of a particular disk apparatus is determined as having been deteriorated, a new disk apparatus is added to the existing disk apparatuses, thereby increasing the size of the volume having a RAID configuration. With this, a load of access to the disk apparatus whose performance has been deteriorated can be reduced, and the performance of the entire volume can be recovered. Also, monitoring a deterioration in performance and recovering the deteriorated performance are automatically performed. Therefore, a deterioration in performance of the entire volume caused by a deterioration in performance of a single disk apparatus can be prevented in advance. Furthermore, the user of the apparatus is not required to decrease the performance of the apparatus, and therefore unwanted confusion due to an error in decision or the like can be prevented in advance. Still further, when the volume size is automatically increased against the deterioration in performance, a part of data blocks written in the existing disk apparatuses can be relocated to the additional disk apparatus, thereby preventing accesses from being concentrated on the additional disk. The above and other objects, features, and advantages of the present invention will become more apparent from the following detailed description with reference to the drawings.

BRIEF DESCRIPTION OF THE DRAWINGS

FIGS. 2A and 2B are block diagrams of a functional structure of the disk array apparatus of FIG. 1 to which the present invention is applied;

FIG. 3 is an illustrative diagram of performance-measurement-value tables of FIGS. 2A and 2B;

FIGS. 4A and 4B are illustrative diagrams of a performance-measurement-threshold table of FIGS. 2A and 2B;

FIGS. 14A and 14B are illustrative diagrams showing details of the relocation process of FIGS. 13A and 13B.

DETAILED DESCRIPTION OF THE PREFERRED EMBODIMENTS

Figure 1:
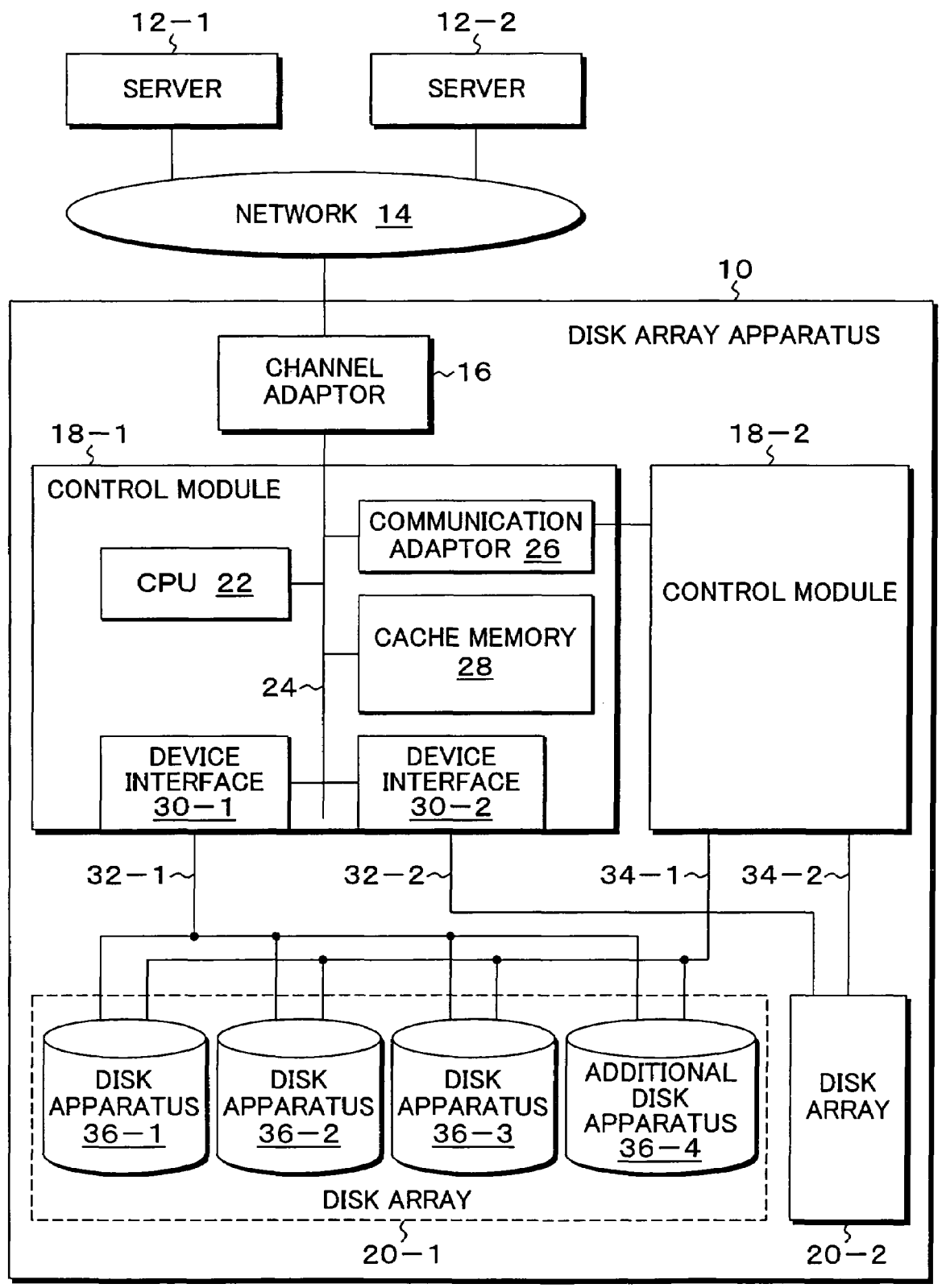
FIG. 1 is a block diagram of a disk array apparatus to which the present invention is applied.

FIG. 1 is a block diagram of a disk array apparatus that functions as a storage control apparatus according to the present invention. In FIG. 1, a disk array apparatus 10 is connected via a network 14 to servers 12-1 and 12-2. The disk array apparatus 10 according to the present invention is used as a storage in a storage area network (SAN). In the storage area network (SAN), the servers 12-1 and 12-2 and the disk array apparatus 10 serving as a storage are connected to each other via a dedicated network 14, such as a fiber channel. Also, the disk array apparatus 10 according to the present invention can be used as a network attached storage (NAS). In the case of the network attached storage (NAS), the servers 12-1 and 12-2 function as file servers sharing the disk array apparatus 10 via the network 14. Furthermore, the disk array apparatus 10 supports file access protocols by different OSes (Operation Systems) in the servers 12-1 and 12-2, thereby allowing files to be shared among different OSes. For example, the OS of the server 12-1 is UNIX (R), whilst the OS of the server 12-2 is WINDOWS (R). The disk array apparatus 10 is provided with a channel adaptor 16, control modules 18-1 and 18-2, and disk arrays 20-1 and 20-2. The channel adaptor 16 executes, via the network 14, a network process required for file access between the servers 12-1 and 12-2. The control modules 18-1 and 18-2 are each provided with, as typically shown by the control module 18-1, a CPU 22. To a bus 24 of the CPU 22, a communication adaptor 26, a cache memory 28, and device interfaces 30-1 and 30-2 are connected. Based on an input/output request from any of the servers 12-1 and 12-2 based on a network process from the channel adaptor 16, the CPU 22 executes a file input/output process on a volume formed of the disk arrays 20-1 and 20-2. The cache memory 28 operates as a write cache or read cache for the disk arrays 20-1 and 20-2. The communication adaptor 26 processes communication with the redundant control module 18-2. The device interfaces 30-1 and 30-2 are provided correspondingly to the disk arrays 20-1 and 20-2, and are implemented by using, for example, SCSI disk drivers supporting a SCSI interface. The disk arrays 20-1 and 20-2 are each provided with disk apparatuses 36-1 to 36-4, as typically shown by the disk array 20-1. Of these, for example, three disk apparatuses 36-1 to36-3 form a volume having a RAID configuration while the disk array apparatus 10 is initially being operated in association with start-up. With RAID 4 being taken as an exemplary RAID configuration, the disk apparatuses 36-1 and 36-2 are for data, whilst the disk apparatus 36-3 is for parity. Also, the disk apparatus 36-4 is an additional disk apparatus for expanding the volume size when the performance is determined through performance measurement according to the present invention as having been deteriorated. Here, the number of disk apparatuses having a RAID configuration in the disk array 20-1 can be assumed to be arbitrary as required. Furthermore, as hot standbys of additional disk apparatus, disk apparatuses can be contained in advance, a required number of which can be added as required to increase the volume size. An example of the disk array apparatus 10 to which the present invention is applied includes ETERNUS NR1000F series manufactured by Fujitsu Limited.

Figure 2B:
Figure 2B:
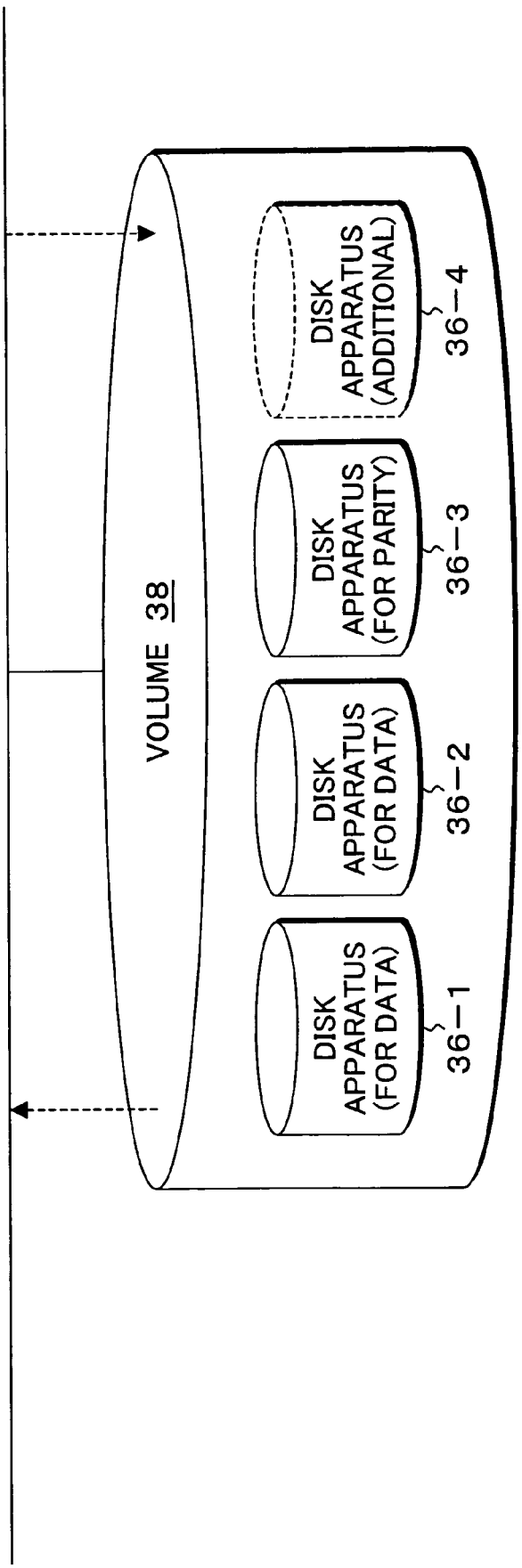

FIGS. 2A and 2B are block diagrams of a functional structure of the disk array apparatus 10 of FIG. 1 to which the present invention is applied. In FIGS. 2A and 2B, the disk array apparatus 10 according to the present invention connected via the network 14 to the servers 12-1 and 12-2 is provided with, in addition to the channel adaptor 16, a resource processing unit 40, a cache processing unit 42, a RAID control unit 44, and a device interface 30, which achieve a function of the control module 18-1. The channel adaptor 16 executes a network process on the servers 12-1 and 12-2. On the other hand, the resource processing unit 40, the cache processing unit 42, the RAID control unit 44, and the device interface 30 forming the control module 18-1 execute a file process on the volume 38 having a RAID configuration formed of the disk apparatuses for data 36-1 and 36-2 and the disk apparatus for parity 36-3. In an embodiment of the present invention, the volume 38 having a configuration of RAID level 4together with the disk apparatuses for data 36-1 and 36-2 and the disk apparatus for parity 36-3 for the volume 38 is taken as an example. Therefore, the RAID control unit 44 executes an input/output process on the RAID level 4 of the volume 38 by taking a data block as a basic unit. For example, for a write request from the server 12-1, data blocks transferred with the write request are assigned to a write logic block address of the disk apparatuses for data 36-1 and 36-2. Also, parity is calculated through an XOR from two pieces of block data assigned to the same logic block address to generate a parity block for the parity data apparatus 36-3, and then the same logic block address is specified for the disk apparatuses for data 36-1 and 36-2 and the disk apparatus for parity 36-3 to concurrently write the data blocks and the parity. Furthermore, as for write data received upon a write request from the server side, the cache processing unit 42 normally performs a cache write on a cache memory to respond a write end to the server side, and then performs a write-back of cache block data deleted through LRU (Least Recently Used) management or the like to the volume 38 side. On the other hand, as for a read request from the server side, when a cache hit does not occurs with the cache processing unit 42, from the volume 38 side via the RAID control unit 44 and the device interface 30, a logic block address and its corresponding data block through specification by the disk apparatus are read, and then a response is then made to the server. In addition to such an input/output process for a normal file process, in the present invention, the RAID control unit 44 is provided with a performance measuring unit 46, a performance-measurement-value storage unit 48, a performance-measurement-value table 50, a performance threshold table 52, and a performance improving unit 54. The performance measuring unit 46 periodically measures the performance of the disk apparatuses for data 36-1 and 36-2 and the disk apparatus for parity 36-3 forming the volume 38 while the disk array apparatus 10 is in operation. The performance-measurement-value storage unit 48 stores a performance measurement value measured by the performance measuring unit 46 in the performance-measurement-value table 50. Items of performance measurement values obtained through measurement of the disk apparatus in the present invention include the following.

(1) a read/write performance represented by a data transfer amount (MB/s) per unit time.

(2) a response time from reception of a command until an end response.

(3) a seek time from reception of a command to a movement of a head to a target track and then on-track.

(4) a rotation latency time of the disk from the on-track on the target track until a target Sector's appearance on the head.

(5) the number of times of errors within a predetermined period of time.

(6) a free space. When the performance is determined as having been deteriorated from the comparison between a performance measurement value stored in the performance-measurement-value table 50 and a performance threshold stored in the performance threshold table 52, the performance improving unit 54 increases the volume size by adding the disk apparatus 36-4 to the volume 38, thereby improving the performance. That is, during the operation with the volume 38 of RAID level 4 being formed of three disk apparatuses, that is, the disk apparatuses for data 36-1 and 36-2 and the disk apparatus for parity 36-3, if the performance of any disk apparatus is determined as having been deteriorated, the disk apparatus 36-4 is added to expand the size of the volume 38, thereby increasing the number of disk apparatuses for data from two to three. Thus, in the case of the same data input/output amount, accesses are distributed to three apparatuses instead of two, thereby improving the input/output performance of the entire volume 38. Particularly, as for the disk apparatus for data whose performance is determined as having been deteriorated, a load ratio with respect to the input/output data amount from the server is reduced from one-half to approximately one-thirds of the entirety by adding a new disk apparatus for data. Thus, the rate of one-half at which the performance has been deteriorated is reduced to the rate of one-thirds, thereby recovering the performance and improving the performance of the entire volume 38. Here, in this embodiment, the number of disk apparatuses to be added at the time of deterioration in performance is one. Alternatively, the number of apparatuses to be added can be an arbitrary number n as required. For example, one or more disk apparatuses are added so that the number of disk apparatuses for data before deterioration in performance is doubled.

FIG. 3 is an illustrative diagram of performance-measurement-value tables provided in FIGS. 2A and 2B. FIG. 3 shows the state in which, in this example, three performance-measurement-value tables 50-1, 50-2, and 50-3 are stored, and the number of tables stored can be up to a maximum number corresponding to the size of a file. If the number exceeds the maximum number, the oldest table is discarded, and a new measurement table is written. As typically shown by 50-1, the performance-measurement-value tables each have stored therein performance measurement values for each of the disk apparatuses 36-1 to 36-3. The performance measurement values have six items, that is, a read/write performance 56, a response time 58, a seek time 60, a rotation latency time 62, the number of times of error 64, and a free space 66. As a matter of course, other than those, arbitrary measurement items can be added for the performance of the disk apparatuses.

FIGS. 4A and 4B are illustrative diagrams of the performance threshold table 52 of FIGS. 2A and 2B. In the present invention, the performance threshold table 52 has contained therein a minimum-performance-threshold table 52-1 shown in FIG. 4A and a relative-performance-threshold table 52-2 shown in FIG. 4B. In the minimum-performance-threshold table 52-1 of FIG. 4A, for the read/write performance, the response time, the seek time, the rotation latency time, the number of times of error, and the free space, minimum performance thresholds TH[A1], TH[B1], TH[C1], TH[D1], TH[E1], and TH[F1] are set, respectively, as fixed values. On the other hand, in the relative-performance-threshold table 52-2 of FIG. 4B, for the read/write performance, the response time, the seek time, the rotation latency time, the number of times of error, and the free space, relative performance thresholds TH[A2], TH[B2], TH[C2], TH[D2], TH[E2], and TH[F2] are calculated, respectively, when it is determined from the performance measurement values whether the performance has been deteriorated, and are then stored. As for the relative performance thresholds, the relative performance values are calculated by the following equation based on the measurement values on the performance-measurement-value table 50-1, for example, obtained through measurement shown in FIG. 3.

(relative performance threshold)=[(a total of performance measurement values/the number of disks)]×relative efficiency $N$ Here, the relative efficiency N takes an arbitrary value in the range of N=0% to 100%. Specifically, a value equal to the rate of each minimum performance threshold in the minimum-performance-threshold table 52-1 of FIG. 4A defined by the rated performance of the disk apparatus can be used. For example, when the minimum performance threshold TH[A1] of the read/write performance is 70% of the rated performance, N=70% can also be used as the relative efficiency N in the equation for calculating the relative performance threshold. The relative performance threshold has a feature in which an average value of performance measurement values in each of the disk apparatuses 36-1 to 36-3 at the moment of each periodical measurement is found, and then the performance-measurement average value is multiplied by a predetermined relative performance rate N to find a relative performance threshold, thereby determining whether the performance is relatively deteriorated with respect to an average performance of the plurality of disk apparatuses forming the volume. In the setting at the time of starting the apparatus, the performance improving unit 54 can select either one of determining based on the minimum-performance-threshold table 52-1 of FIG. 4A whether the performance has been deteriorated and determining based on the relative-performance-threshold table 52-2 of FIG. 4B whether the performance has been deteriorated. Also, as required, both of the minimum-performance-threshold table 52-1 and the relative-performance-threshold table 52-2 can be used to determine whether the performance has been deteriorated.

Figure 5A:
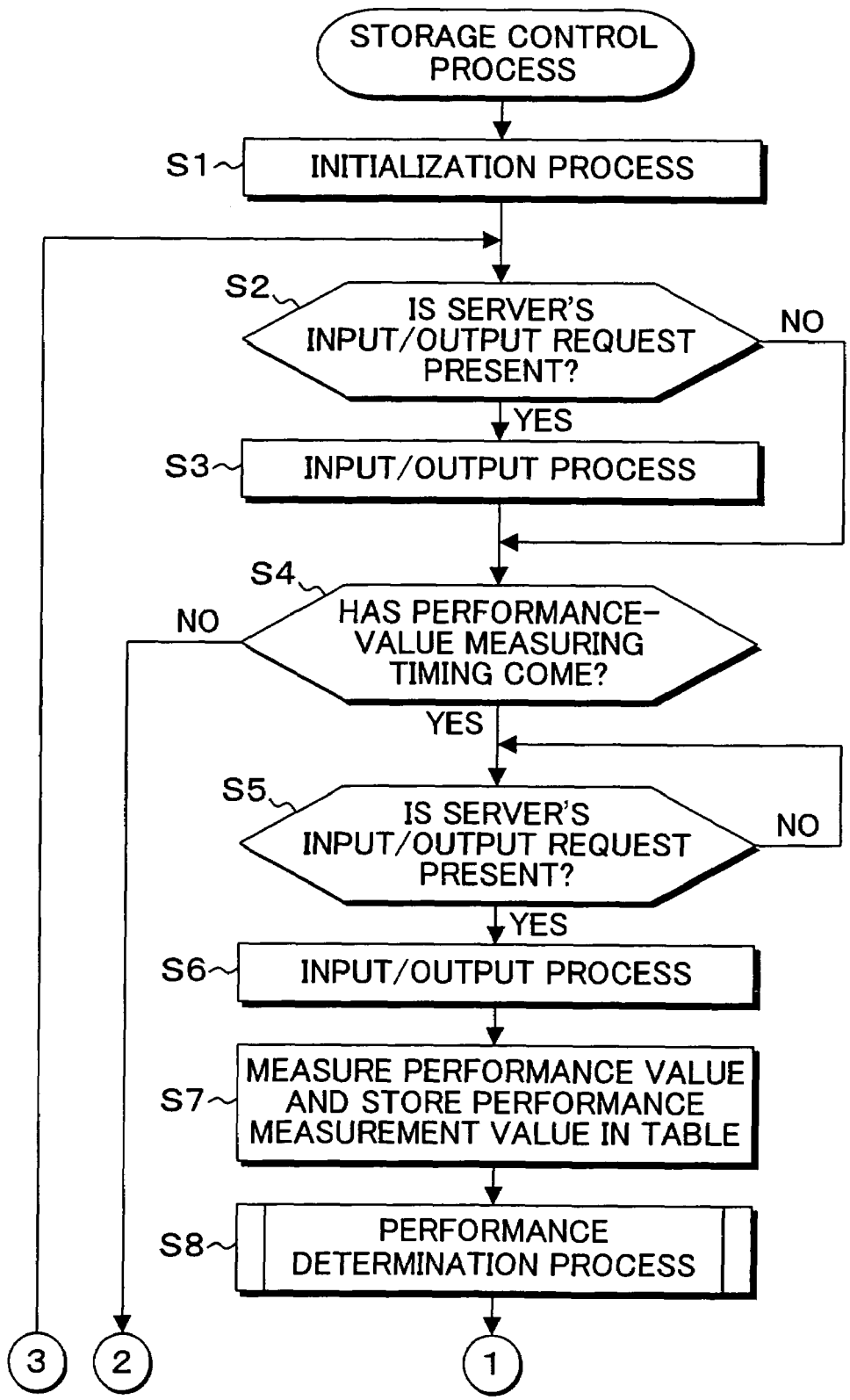
FIGS. 5A and 5B are flowcharts of a storage control process in FIGS. 2A and 2B according to the present invention.
Figure 5B:
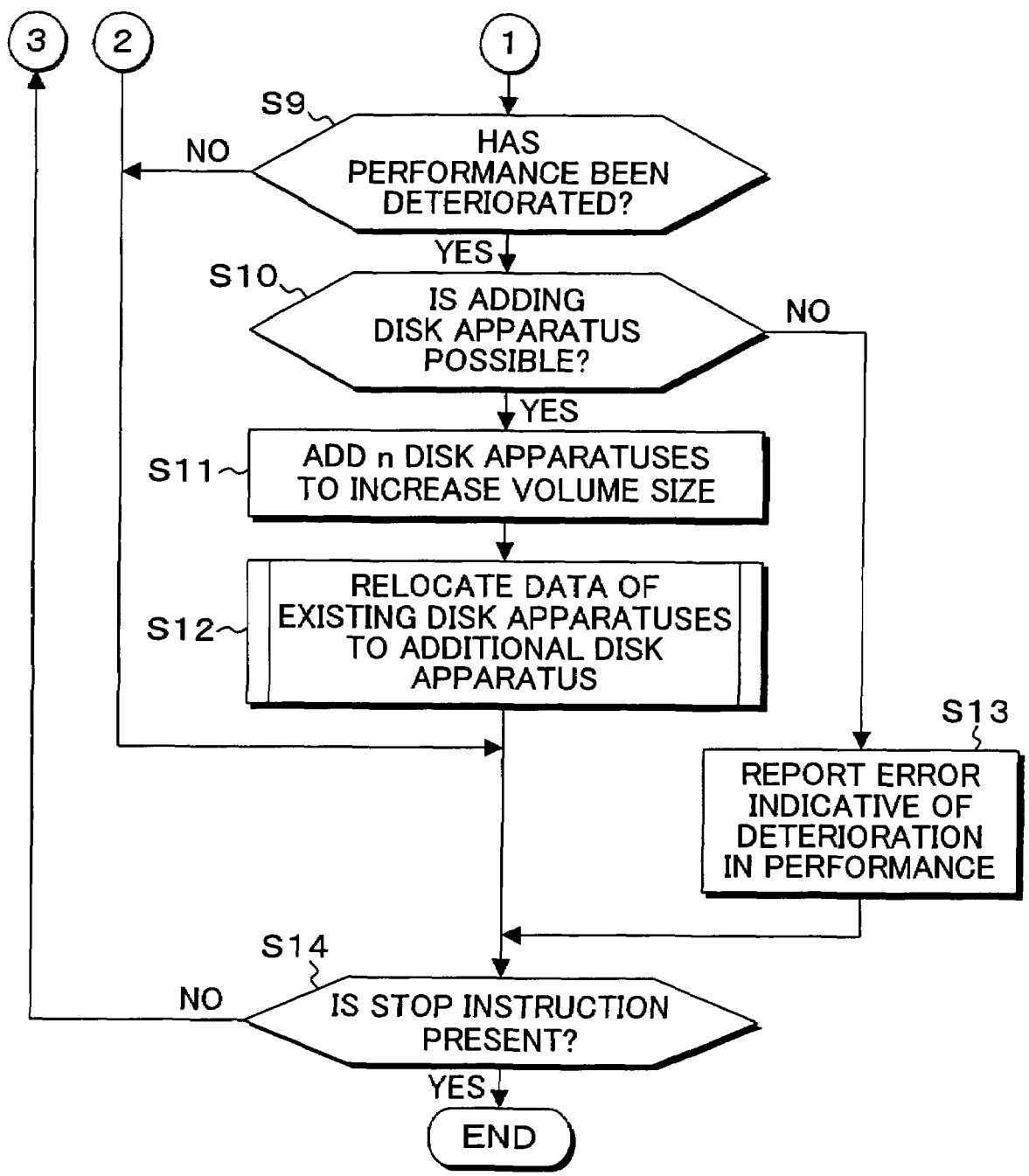
Figure 6:
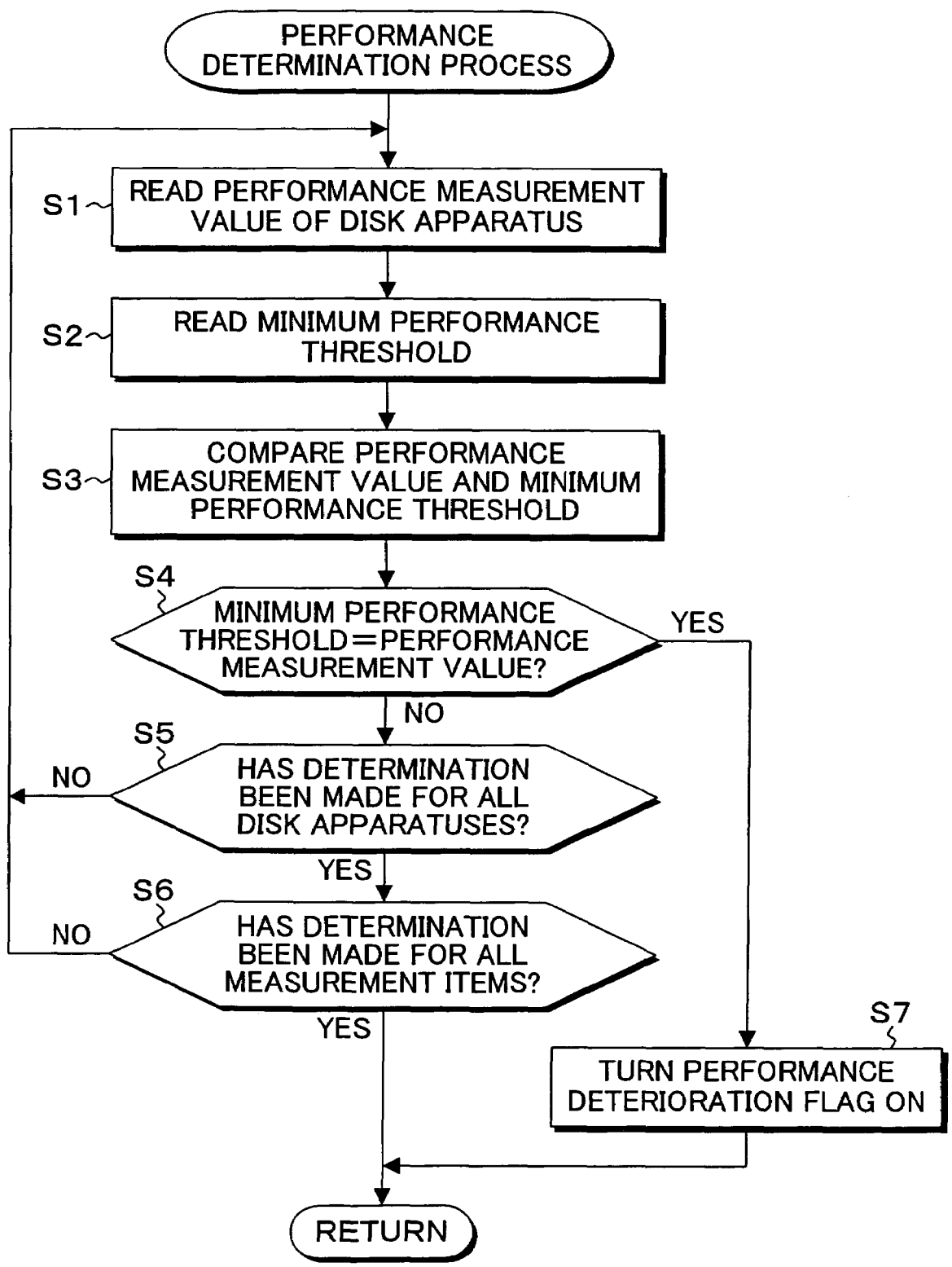
FIG. 6 is a flowchart of a performance determination process of FIGS. 5A and 5B using a minimum performance threshold value.

FIGS. 5A and 5B are flowcharts of a storage control process to be performed by the disk array apparatus according to the present invention in FIGS. 2A and 2B. In FIGS. 5A and 5B, after an initialization process is performed in step S1 in association with power-on, it is checked in step S2 whether a server's input/output request is present. Upon determination in step S2 as to whether a server's input/output request, an input/output process according to RAID 4 is performed on the volume 38 in step S3. Then, it is checked in step S4 whether a performance-value measuring timing has come. The performance-value measuring timing is set at predetermined constant time intervals. Upon determination in step S4 as to the performance-value measuring timing, the procedure goes to step S5, wherein it is checked whether a server's input/output request is present. If a server's input/output request is present, as with the case of FIGS. 2A and 2B, an input/output process is performed in step S6 on the volume 38 according to the RAID level 4 . Then, in step S7, in association with the input/output process in step S6, the performance measuring unit 46 performs measurement on each disk apparatus for the respective measurement items of the read/write performance, the response time, the seek time, the rotation latency time, the number of times of errors, and the free spaces. The performance-measurement-value storage unit 48 then stores the measurement results in the performance-measurement-value table 50 as shown in FIG. 3. Then in step S8, the performance improving unit 54 performs a performance determination process by comparing the performance measurement value stored in the performance-measurement-value table 50 and the performance threshold set in the performance threshold table 52. In this performance determination process, either one of the minimum-performance-threshold table 52-1 of FIG. 4A and the relative-performance-threshold table 52-2 of FIG. 4B is used. Next, it is checked in step S9, from the results of the performance determination process, whether the performance of any one of the disk apparatuses has been deteriorated. If it is determined that the performance has been deteriorated, it is checked in step S10 whether adding a disk apparatus is possible. If adding a disk apparatus is possible, a present number of n disk apparatuses, which is one in the present embodiment, is added in step S11 to increase the size of the volume 38. Then in step S12, the data in the existing disk apparatus is relocated to the additional disk apparatus, thereby preventing accesses from being concentrated on the additional disk apparatus. On the other hand, if a process of adding a disk apparatus has already been completed and addition is not possible in step S10, an error report is issued in step S13 indicating that the performance is determined as having been deteriorated. This error report is displayed as required on a personal computer or box panel at the server side or for managing the disk array apparatus to allow human measures to improve the deteriorated performance. The process of steps S1 to S13 is repeated until a stop instruction is present in step S14. FIG. 6 is a flowchart showing details of the performance determination process in step S8 of FIGS. 5A and 5B using the minimum performance threshold value set on the minimum-performance-threshold table 52-1 of FIG. 4A. In FIG. 6, in the performance determination process using the minimum-performance-threshold table, the performance measurement value of a specific disk apparatus is read in step S1. For example, from the latest performance-measurement-value table 50-1 in FIG. 3, a measurement result A1 of the read/write performance 56, which is the first performance measurement value, is read for the disk apparatus 36-1. Next, in step S2, from the minimum-performance-threshold table 52-1 of FIG. 4A, the minimum performance threshold TH[A1] of the read/write performance is read. Then in step S3, the read/write performance A1 and the minimum performance threshold TH[A1] are compared. If the read/write performance A1 is smaller than the minimum performance threshold TH[A1], the performance is determined as having been deteriorated, a performance deterioration flag is turned on in step S7, and then the procedure returns to the main routine of FIGS. 5A and 5B. On the other hand, if the read/write performance A1 is larger than the minimum performance threshold TH[A1] and the performance is not determined in step S4 as having been deteriorated, the procedure goes to step S5, wherein it is checked whether determination has been made for all disk apparatuses, and if such determination has not been made, the procedure returns to step S1 and a similar process is repeated for the next disk apparatus 36-2. If it is determined in step S5 that determination has been made for all disk apparatuses, the procedure goes to step S6, wherein it is checked whether determination has been made for all measurement items, and if such determination has not been made, the procedure returns to step S1 and a similar process is repeated for the next performance measurement value, that is, the response time. In this manner, for all disk apparatuses 36-1 to 36-3, the measurement value of each of the read/write performance, the response time, the seek time, the rotation latency time, the number of times of error, and the free space is compared with the relevant minimum performance threshold. Upon determination of a performance measurement value equal to or smaller than the minimum performance threshold, the performance deterioration flag is turned on, and the procedure returns to the main routine of FIGS. 5A and 5B, wherein deterioration in performance is recognized in step S9 and, on condition in step S10 that adding a disk is possible, a disk apparatus is added in step S11, thereby increasing the volume size.

Figure 7:
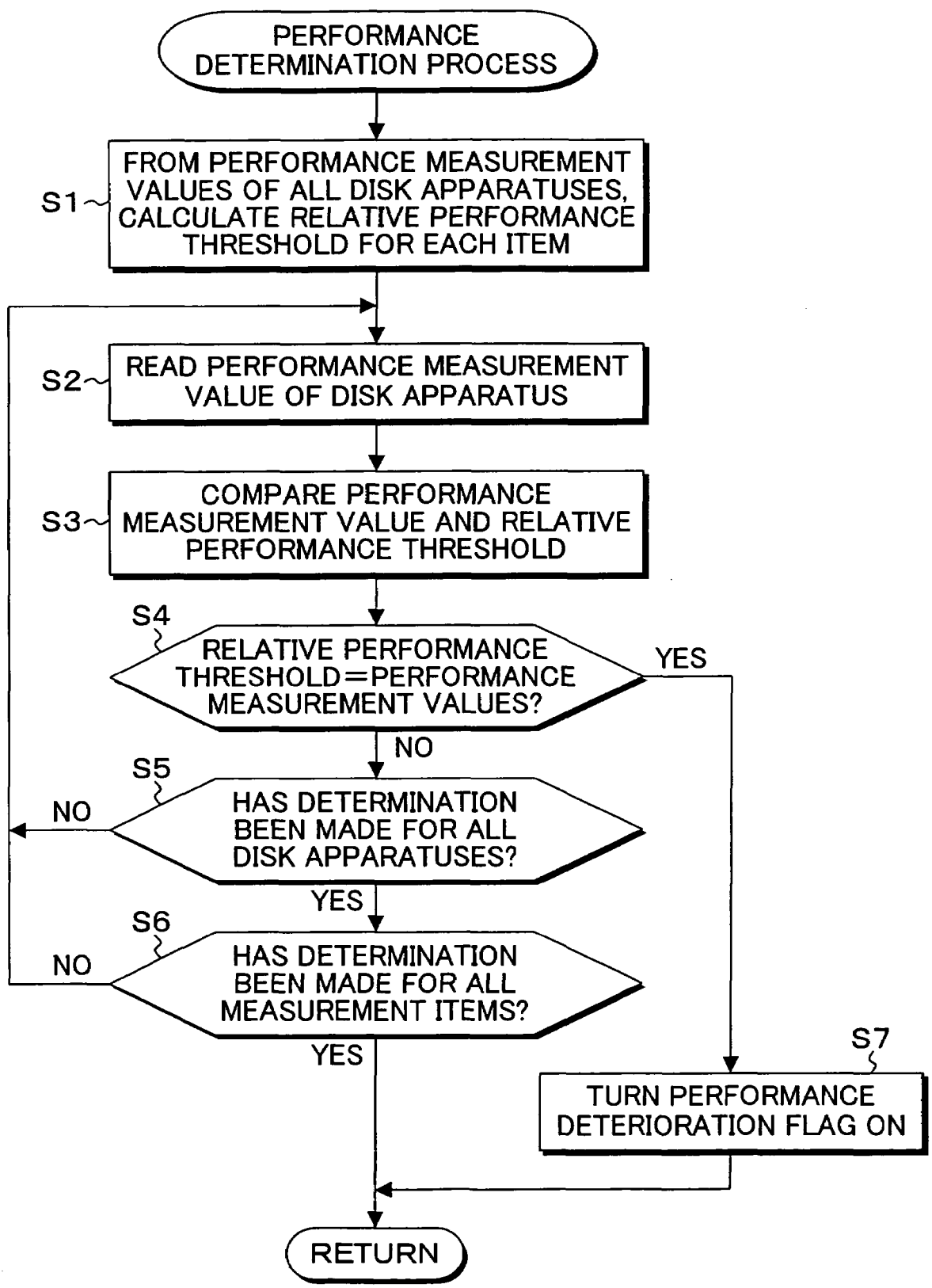
FIG. 7 is a flowchart of the performance determination process of FIGS. 5A and 5B using a relative performance threshold value.

FIG. 7 is a flowchart showing details of the performance determination process in step S8 of FIGS. 5A and 5B using the relative performance threshold value. In FIG. 7, first in step S1, a relative threshold for each item is calculated from the performance measurement values for all disk apparatuses. For example, when the latest performance-measurement-value table 50-1 shown in FIG. 3 is taken as an example, as for the read/write performance 56, for example, a relative performance threshold TH[A2] of the read/write performance is calculated by using the read/write performances A1, A2, and A3 of three disk apparatuses 36-1 to 36-3 and their relative failure rate N as

TH[A2]=[(A1+A2+A3)/3]×N.

Similarly, as for the response time 58, the seek time 60, the rotation latency time 62, the number of times of error 64, and the free space 66, relative thresholds TH[B2], TH[C2], TH[D2], TH[E2], and TH[F2] are calculated. Then in step S2, the performance measurement value of the disk apparatus is read. For example, from the latest performance-measurement-value table 50 in FIG. 3, the measurement value A1 of the read/write performance 56 of the disk apparatus 36-1 is read. Then in step S3, the relative performance threshold calculated in step S1 is compared with the measurement performance value read in step S2. If the performance measurement value is equal to or smaller than the measurement performance threshold, the performance is determined in step S4 as having been deteriorated, the performance deterioration flag is turned on in step S7, and the procedure returns to the main routine of FIGS. 5A and 5B. If the performance measurement value is larger than the relative performance threshold, it is determined in step S5 whether determination has been made for all disk apparatuses, and then a similar process can be repeated in step S2 for the next disk apparatus. If it is determined in step S5 that determination has been made for all disk apparatuses, it is checked in step S6 whether determination has been made for all measurement items, and then the procedure can be returned to step S2 for repeating a similar process for the next measurement item. As a result, the performance measurement values in the latest performance-measurement-value table 50 of FIG. 3 are each compared with the calculated relative thresholds in the relative-performance-threshold table 52-2 of FIG. 4B for determination. If the performance is determined as being deteriorated for any one of the items, a disk is added to the volume to increase the volume size, thereby improving the performance.

Figure 8:
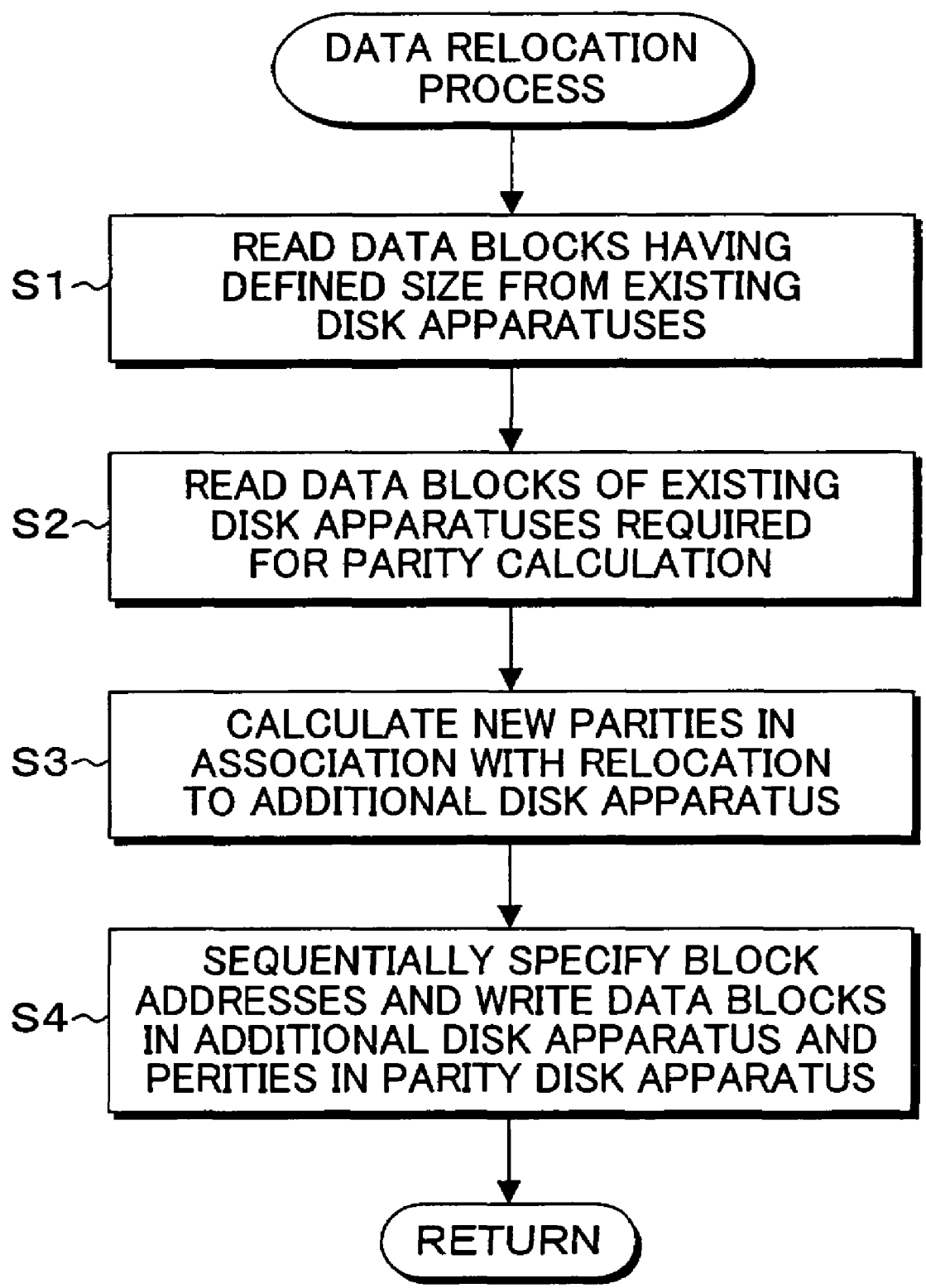
FIG. 8 is a flowchart of a data relocation process of FIGS. 5A and 5B requiring a read from the existing disk apparatus for parity calculation.

FIG. 8 is a flowchart of a data relocation process in step S12 of FIGS. 5A and 5B after a disk apparatus is added. In this flowchart, the case where a read from the existing disk apparatus is required for parity calculation is taken as an example. In FIG. 8, in the data relocation process, data blocks having the size corresponding to the latest stored file are read in step S1 from the existing disk apparatuses. Then in step S2, data blocks in the existing disk apparatuses required for parity calculation are read. In step S3, new parities are calculated in association with relocation for the additional disk apparatus. Then in step S4, block addresses of the additional disk apparatus are sequentially specified to write the data blocks in the additional disk apparatus and, at the same time, the parities are written in the disk apparatus for parity.

Figure 9A:
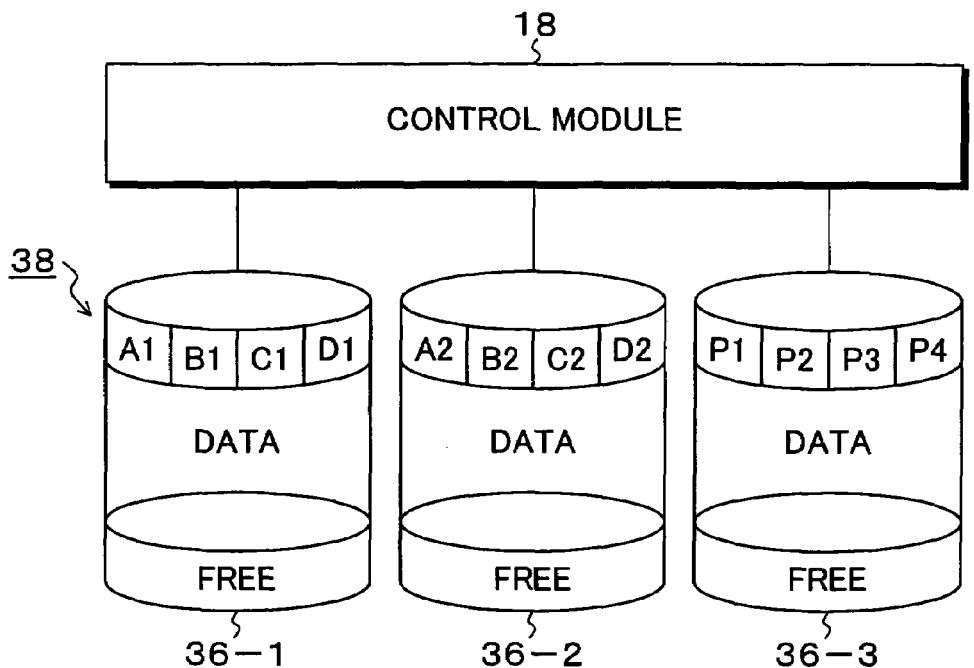
FIGS. 9A and 9B are illustrative diagrams of a process of increasing a volume size by adding a disk apparatus when the performance is determined as having been deteriorated.
Figure 9B:
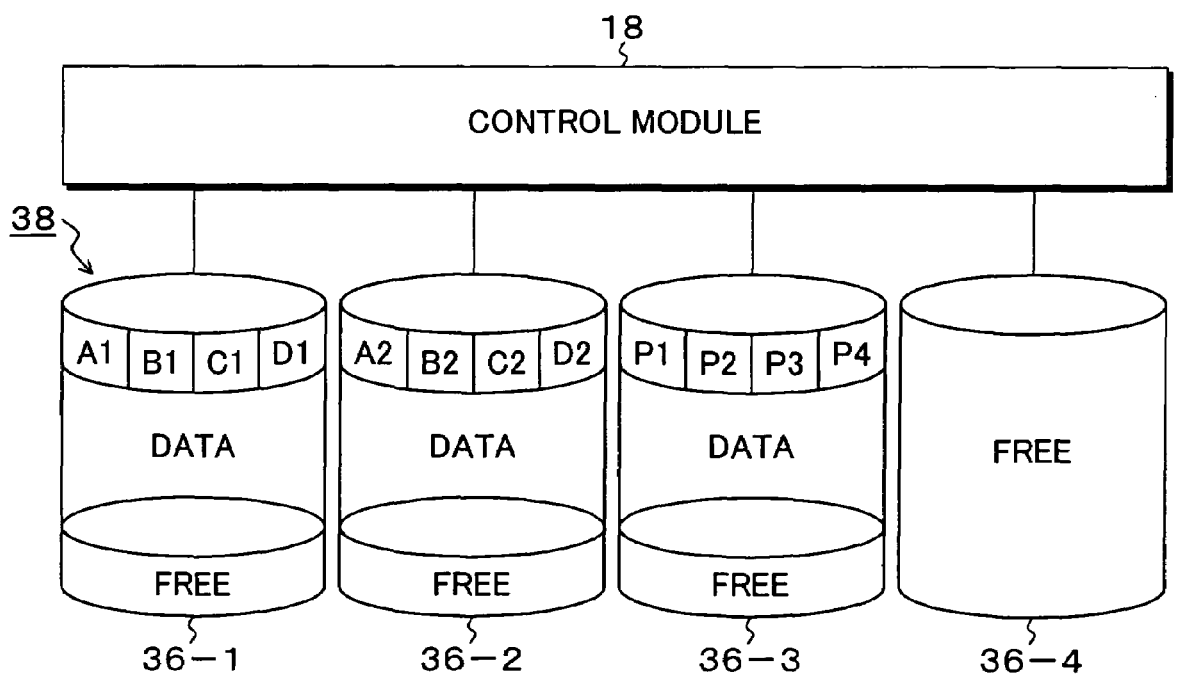

FIGS. 9A and 9B are illustrative diagrams of a process of increasing a volume size by adding a disk apparatus when the performance is determined as having been deteriorated. FIG. 9A shows the volume 38 before addition, wherein the disk apparatuses for data 36-1 and 36-2 and the disk apparatus for parity 36-3 form the volume 38 at the RAID level 4. For example, as write data of the latest file, data blocks A1, B1, C1, and D1 are stored in the data disk 36-1, data blocks A2, B2, C2, and D2 are stored in the disk apparatuses for data 36-2, and parities P1, P2, P3, and P4 calculated through an XOR of both of the above are stored in the disk apparatus for parity 36-3. In this state, if the performance of any disk apparatus is determined as having been deteriorated in the control module 18, the disk apparatus 36-4 is added as shown in FIG. 9B to expand the size of the volume 38. After such expansion of the volume 38 with the additional disk apparatus 36-4, as shown in FIGS. 10A and 10B, the data relocation process according to the flowchart of FIG. 8 is performed.

Figure 10A:
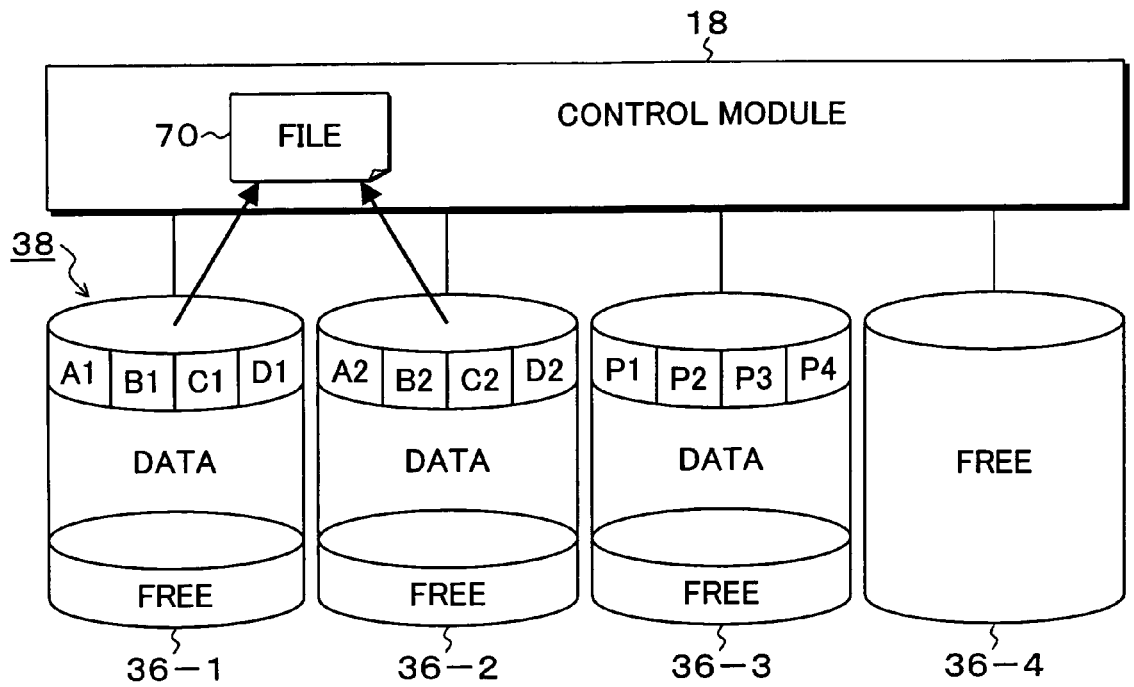
FIGS. 10A and 10B are illustrative diagrams of a relocation process for writing a part of data blocks of the existing disk corresponding to FIGS. 9A and 9B in an additional disk apparatus.

In FIG. 10A, from the existing disk apparatuses for data 36-1 and 36-2, the data blocks A1, B1, C1 and D1 and the data blocks A2, B2, C2 and D2 forming a file 70 read on memory of the control module 18. These data blocks read as the file 70 are written in the additional disk apparatus 36-4 in a free state in its entirety, as shown in FIG. 10B. In this case, in the disk apparatus for parity 36-3, parities P1' to P8' newly calculated in association with the write of the data blocks in the additional disk apparatus 36-4 are written.

Figure 10B:
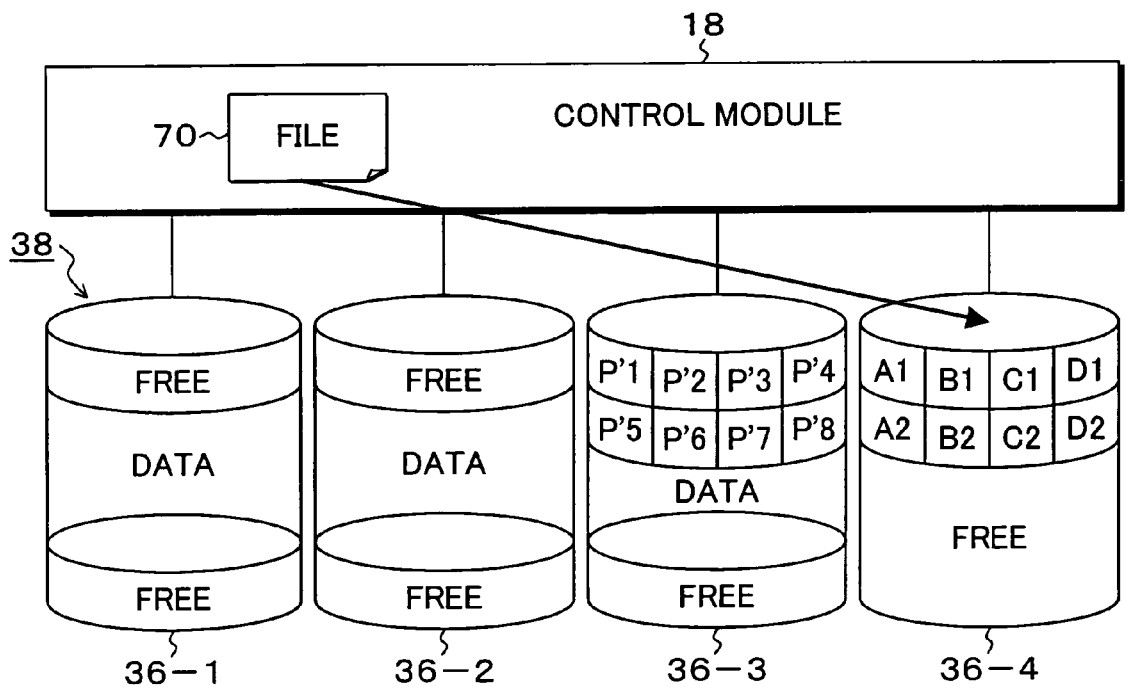
Figure 11A:
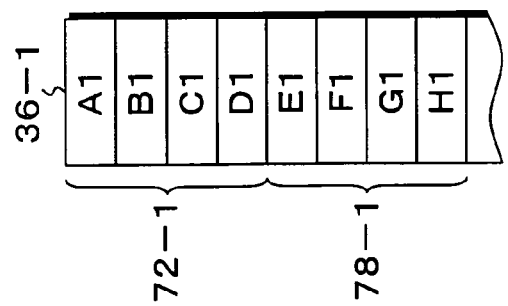
FIGS. 11A and 11B are illustrative diagrams showing details of the relocation process of FIGS. 10A and 10B.
Figure 11A:
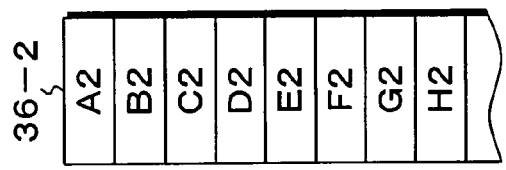
Figure 11A:
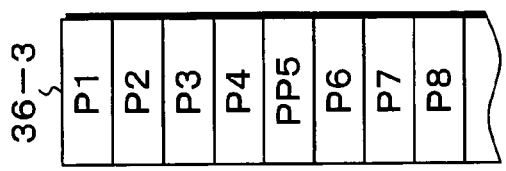
Figure 11A:
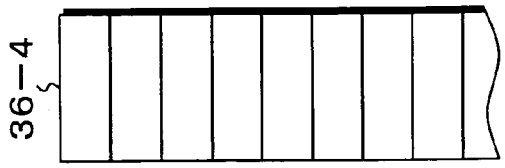
Figure 11B:
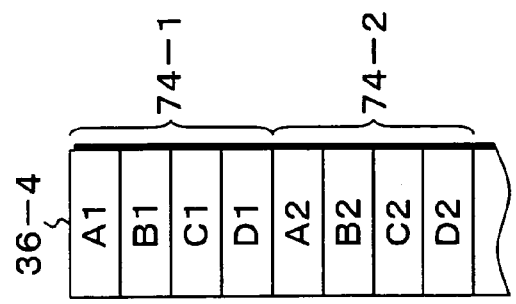
Figure 11B:
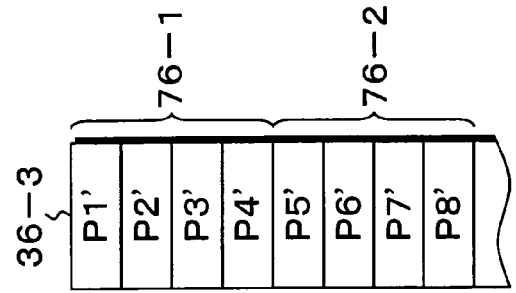
Figure 11B:
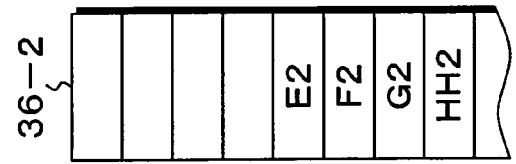
Figure 11B:
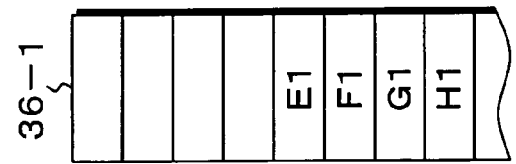

FIGS. 11A and 11B are illustrative diagrams showing details of the relocation process of FIGS. 10A and 10B, wherein data blocks are arranged in order of block address for each disk apparatus. FIG. 11A shows a storage state of the data blocks in the disk apparatuses 36-1 to 36-4 before data relocation. In this storage state, data relocation is performed such that, for example, read areas 72-1 and 72-2 each having four blocks from the head of the existing disk apparatuses 36-1 and 36-2 forming the file 70 are first read, and then data is relocated to relocation areas 74-1 and 74-2 of the additional disk apparatus 36-4 shown in FIG. 11B. At this time, in parity update areas 76-1 and 76-2 of the disk apparatus for parity 36-3, parities P1' to P8' newly calculated in association with data relocation are stored. As for calculation of these parities P1' to P8' for the parity update area 76-1, the parities P1' to P4' can be calculated only from the data blocks A1 to D1 of the read area 72-1. On the other hand, for the parity update area 76-2, an XOR of the data blocks A2, B2, C2, and D2 of the data relocation area 74-2 and data blocks of the read areas 78-1 and 78-2 each having another four blocks of the existing disk apparatuses 36-1 and 36-2 is required. For this reason, the read areas 78-1 and 78-2 of the existing disk apparatuses 36-1 and 36-2 are read, and then the parities P5' to P8' are calculated for updating between the relocation areas 74-1 and 74-2 from an XOR for each data block group of the same block address.

Figure 12:
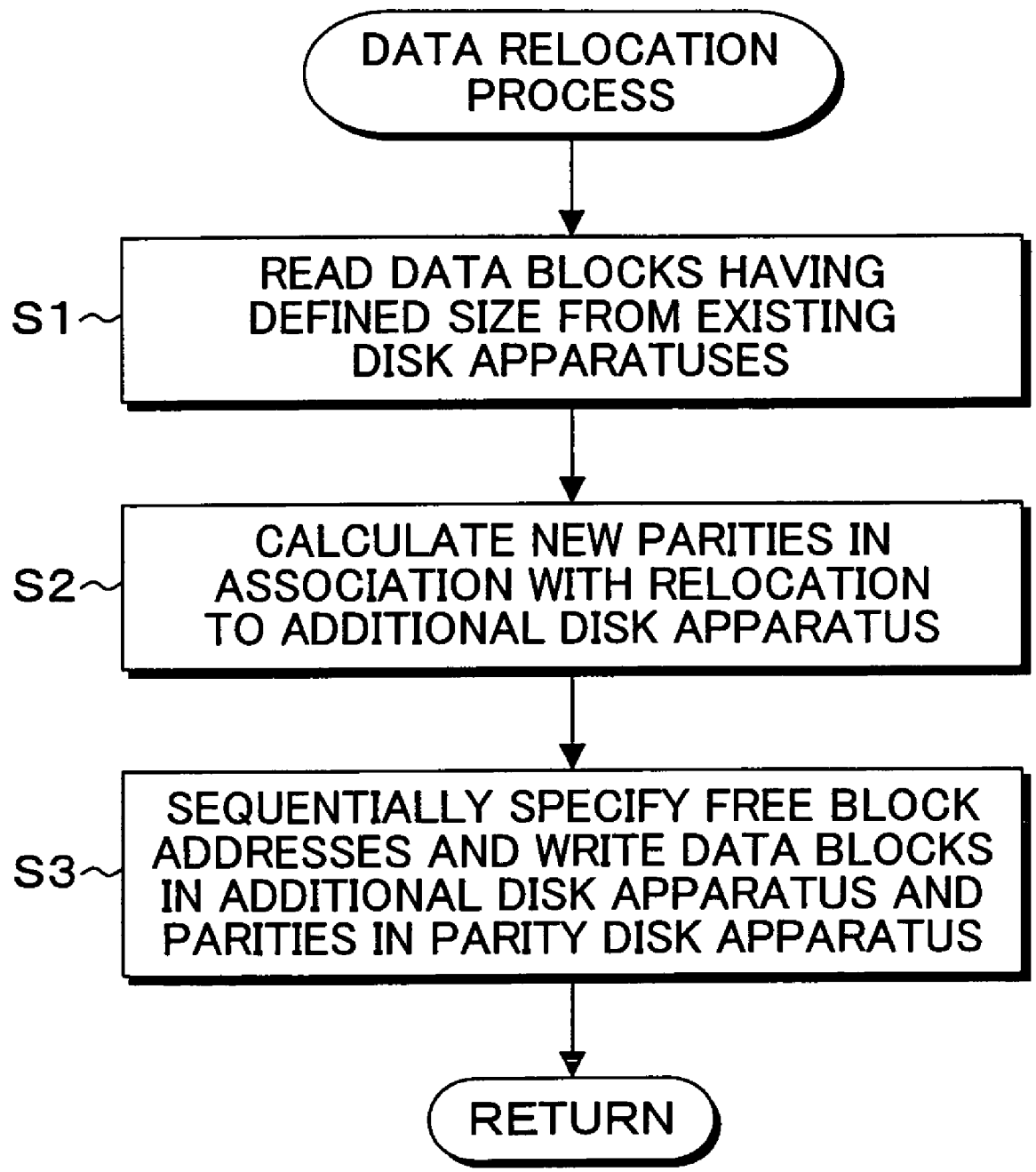
FIG. 12 is a flowchart of a data relocation process of FIGS. 5A and 5B allowing parity calculation by reading only a relocated data block from the existing disk.

FIG. 12 is a flowchart showing a data relocation process on the additional disk apparatus in step S12 of FIGS. 5A and 5B according to another embodiment. In this data relocation process, only the relocation data blocks read from the existing disk apparatuses are required for parity calculation. In FIG. 12, in the data relocation process, data blocks having a defined size are read in step S1 from the existing disk apparatuses. In step S2, new parities in association with data relocation to the additional disk apparatus are calculated. Then in step S3, free block addresses are sequentially specified, and the data blocks are written in all of the disk apparatuses for data including the existing disk apparatuses and the additional disk apparatus and, at the same time, the parities are written in the disk apparatus for parity.

Figure 13A:
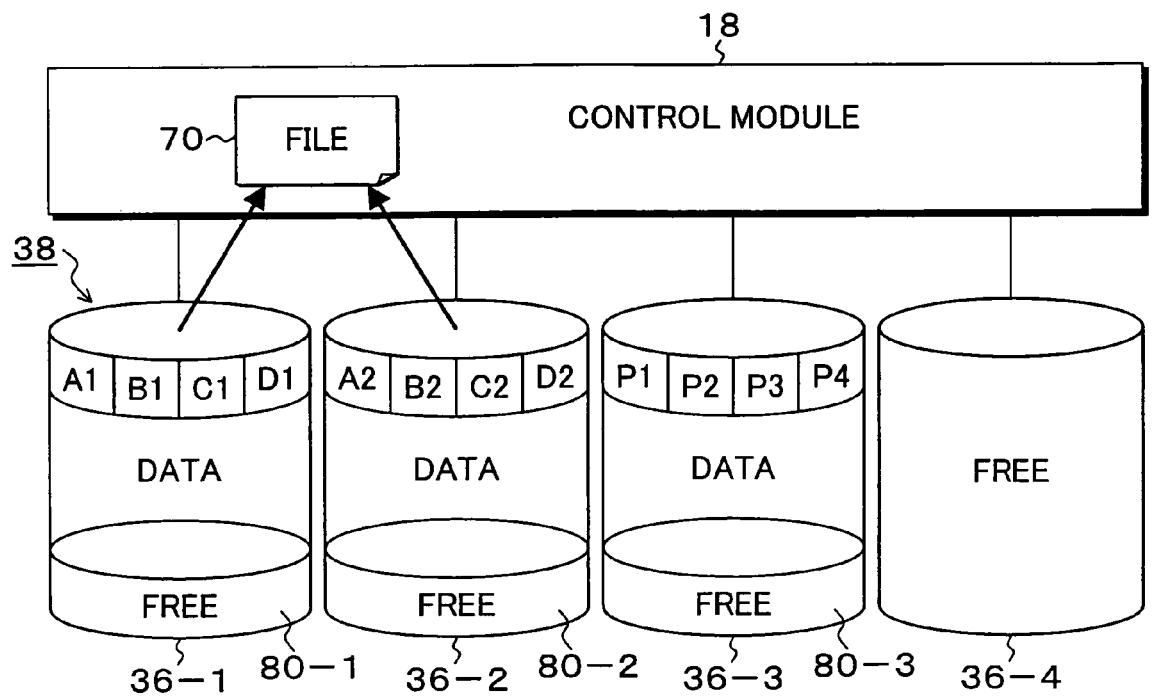
FIGS. 13A and 13B are illustrative diagrams of a data relocation process corresponding to FIG. 12.
Figure 13B:
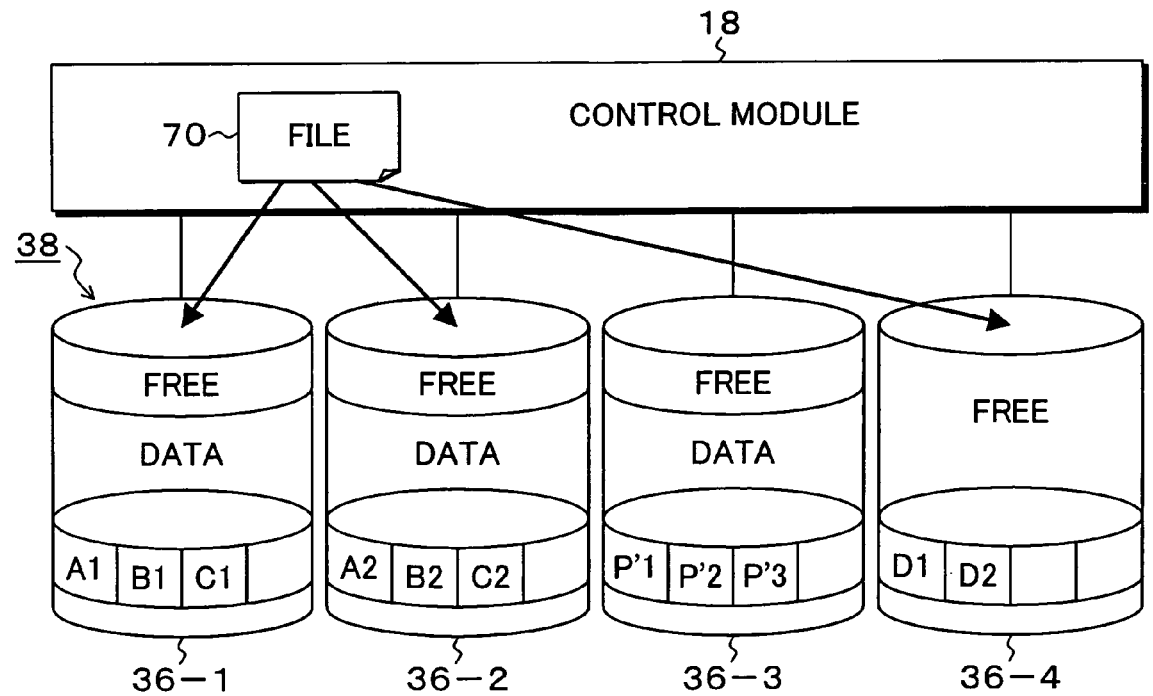

FIGS. 13A and 13B are illustrative diagrams of a data relocation process corresponding to the flowchart of FIG. 12. FIG. 13A shows a read process from the existing disk apparatus for data relocation when the disk apparatus 36-4 is added. In this read for data relocation, the data blocks A1, B1, C1, and D1 and the data blocks A2, B2, C2, and D2 forming the file 70 are read from the existing disk apparatuses 36-1 and 36-2. Then, as shown in FIG. 13B, the data blocks forming the file 70 are written equally in free areas of the existing disk apparatuses 36-1 and 36-2 and the additional disk apparatus 36-4. That is, since the file 70 is formed of eight data blocks, three blocks from the head are sequentially written in each of the existing disk apparatuses 36-1 and 36-2, and then the remaining two are written in the additional disk apparatus 36-4. In this case, in the disk apparatus for parity 36-3, parities P'1, P'2, and P'3 have been calculated and stored based on the data forming the file 70 read from the existing disk apparatuses 36-1 and 36-2. Therefore, unlike the data relocation of FIGS. 10A and 10B, other data blocks do not have to be newly read from the existing disk apparatuses 36-1 and 36-2 for parity calculation.

FIGS. 14A and 14B are illustrative diagrams showing details of the relocation process of FIGS. 13A and 13B. FIG. 14A shows the state before data relocation, wherein, for example, read areas 72-1 and 72-2 forming the file 70 and each having four blocks from the head are read from the existing disk apparatuses 36-1 and 36-2. Then, as shown in FIG. 14B, the read eight data blocks A1 to D1 and A2 to D2 are equally divided from the head into data blocks A1 to C1, data blocks A2 to C2, and data blocks D1 and D2, and with free areas of the existing disk apparatuses 36-1 and 36-2 and the additional disk apparatus 36-4 being taken as relocation areas 82-1, 82-2, and 82-4, then block addresses are read and sequentially read. At this time, in a relocation area 82-3 of the disk apparatus for parity 36-3, parities P1', P2' and P3' are calculated and stored. As for the calculation of the parities P1', P2' and P3', the parities P1', P2' and P3' are calculated such that, in accordance with the allocation of the data blocks in the relocation areas 82-1, 82-2, and 82-4 in the disk apparatuses 36-1, 36-2, and 36-4 of FIG. 14B, an XOR calculation is performed for each of data blocks located at the same block address, that is, for each of (A1, A2, D1), (B1, B2, D2) and (C1, C2), and then are stored. In such data relocation of FIGS.

12, 13A, 13B, 14A, and 14B, parity calculation at the time of data relocation can be performed only from the data blocks subjected to data relocation, and data blocks for parity calculation do not have to be newly read from the existing disk apparatuses, thereby reducing processing load. Furthermore, the present invention is to provide a program executed by the CPU 22 in the control module 18-1 provided in the disk array apparatus 10 of FIG. 1. This program includes procedures according to the flowcharts of FIGS. 5A, 5B, 6, 7, 8, and 12. Also, in the above embodiment, the case of a volume formed of RAID level 4 is taken as an example. Alternatively, the present invention can also be applied to a volume formed of another RAID level by increasing the disk size so that the volume size is increased when the performance of a specific disk apparatus is determined as having been deteriorated. Still further, in the above embodiment, on the performance-measurement-value table shown in FIG. 3, the measurement result on the latest performance-measurement-value table and the performance threshold are compared to determine whether the performance has been deteriorated. Alternatively, an average value of performance measurement values may be each calculated from a plurality of performance measurement tables including the latest performance measurement table to determine, by comparison with the performance threshold, whether the performance has been deteriorated. The same goes for calculation of the relative performance threshold on the relative-performance-threshold table 52-2 of FIG. 4B, wherein an average value of the latest calculated relative performance threshold and the relative performance thresholds previously calculated for a plurality of tables is calculated for use in determination by comparison with the performance measurement value. As such, by using the measurement results on the performance-measurement-value tables for a plurality of measuring timings, a temporary deterioration in performance is excluded from processing, thereby achieving stable performance evaluation. Still further, in the above embodiment, the case of a disk array apparatus used as a storage of a network is taken as an example. The present invention is not restricted to this, and can be applied to a disk array apparatus that can be used as a storage of a main frame or the like if a volume formed of a plurality of disk apparatuses is used. Still further, the present invention includes appropriate modifications without impairing its objects and advantages, and is not restricted by the numerical values shown in the above embodiment.

What is claimed is:

1. A storage controlling method of accessing, based on an input/output request from an upper apparatus, a volume, having a plurality of storage devices forming an RAID configuration and storage devices for addition in hot standby, formed of said plurality of storage devices having a RAID configuration, comprising:
   a performance measuring step of periodically measuring performance of the plurality of storage devices during an apparatus operation;
   a performance-measurement-value storing step of storing a performance measurement value obtained through measurement in the performance measuring step; and
   a performance improving step of increasing a size of the volume by adding at least one of the storage devices in hot standby when the performance is determined from the performance measurement value in the performance-measurement-value storing step as having been deteriorated.

2. The storage control method according to claim 1, wherein in the performance measuring step, performances of a plurality of types in the storage devices are measured, in the performance-measurement-value storing step, performance measurement values of the plurality of types obtained through measurement in the performance measuring step are stored, and in the performance improving step, a performance threshold is set for each of the performance measurement values of the plurality of types, and the size of the volume is increased by adding a storage device when at least any one of the performance measurement values falls below a corresponding performance threshold.

3. The storage control method according to claim 1, wherein the storage devices are disk apparatuses that read and write data from and to a disk medium, and the performance measurement values of the disk apparatuses include any one or combination of a read/write performance represented by a data transfer amount per unit time, a response time from reception of a command until an end response, a seek time from reception of a command to a movement of a head to a target track and then on-track, a rotation latency time of the disk from the on-track on the target track until a target sector's appearance on the head, and the number of times of errors within a predetermined period of time and a free space.

4. The storage control method according to claim 1, wherein in the performance improving step, a minimum performance threshold value is set in advance so as to correspond to the performance measurement value, and the size of the volume is increased by adding a storage device when the performance measurement value is equal to or smaller than the minimum performance threshold.

5. The storage control method according to claim 1, wherein in the performance improving step, a relative performance threshold is found by multiplying an average value of the performance measurement values of the plurality of storage devices by a relative performance rate, and the size of the volume is increased by adding a storage device when the performance measurement value is equal to or smaller than the relative performance threshold.

6. The storage control method according to claim 1, wherein in the performance improving step, when a storage device is added, one step of data written in an existing storage device is relocated to the additional storage device.

7. The storage control method according to claim 1, wherein in the performance improving step, when a storage device is added, one step of data written in an existing storage device is relocated to the additional storage device and the existing storage device 8. A computer-readable storage medium having recorded thereon a program for controlling a storage apparatus that accesses, based on an input/output request from an upper apparatus, a volume, having a plurality of storage devices forming an RAID configuration and storage devices for addition in hot standby, formed of said plurality of storage devices having a RAID configuration, wherein said program allows a computer to execute:

a performance measuring step of periodically measuring performance of the plurality of storage devices during the apparatus operation;

a performance-measurement-value storing step of storing a performance measurement value obtained through measurement in the performance measuring step; and a performance improving step of increasing a size of the volume by adding at least one of the storage devices in hot standby when the performance is determined from the performance measurement value in the performance-measurement-value storing step as having been deteriorated.

9. The storage medium according to claim 8, wherein in the performance measuring step, performances of a plurality of types in the storage devices are measured, in the performance-measurement-value storing step, performance measurement values of the plurality of types obtained through measurement in the performance measuring step are stored, and in the performance improving step, a performance threshold is set for each of the performance measurement values of the plurality of types, and the size of the volume is increased by adding a storage device when at least any one of the performance measurement values falls below a corresponding performance threshold.

10. The storage medium according to claim 8, wherein the storage devices are disk apparatuses that read and write data from and to a disk medium, and the performance measurement values of the disk apparatuses include any one or combination of a read/write performance represented by a data transfer amount per unit time, a response time from reception of a command until an end response, a seek time from reception of a command to a movement of a head to a target track and then on-track, a rotation latency time of the disk from the on-track on the target track until a target sector's appearance on the head, and the number of times of errors within a predetermined period of time and a free space.

11. The storage medium according to claim 8, wherein in the performance improving step, a minimum performance threshold value is set in advance so as to correspond to the performance measurement value, and the size of the volume is increased by adding a storage device when the performance measurement value is equal to or smaller than the minimum performance threshold.

12. The storage medium according to claim 8, wherein in the performance improving step, a relative performance threshold is found by multiplying an average value of the performance measurement values of the plurality of storage devices by a relative performance rate, and the size of the volume is increased by adding a storage device when the performance measurement value is equal to or smaller than the relative performance threshold.

13. The storage medium according to claim 8, wherein in the performance improving step, when a storage device is added, one step of data written in an existing storage device is relocated to the additional storage device.

14. The storage medium according to claim 8, wherein in the performance improving step, when a storage device is added, one step of data written in an existing storage device is relocated to the additional storage device and the existing storage device.

15. A storage control apparatus that accesses, based on an input/output request from an upper apparatus, a volume, having a plurality of storage devices forming an RAID configuration and storage devices for addition in hot standby, formed of a plurality of storage devices having a RAID configuration, the storage control apparatus comprising:

a performance measuring unit that periodically measures performance of the plurality of storage devices during the apparatus operation;

a performance-measurement-value storage unit that stores a performance measurement value obtained through measurement by the performance measuring unit; and a performance improving unit that increases a size of the volume by adding at least one of the storage devices in hot standby when the performance is determined from the performance measurement value in the performance-measurement-value storage unit as having been deteriorated.

16. The storage control apparatus according to claim 15, wherein the performance measuring unit measures performances of a plurality of types in the storage devices, the performance-measurement-value storage unit stores performance measurement values of the plurality of types measured by the performance measuring unit, and the performance improving unit sets a performance threshold for each of the performance measurement values of the plurality of types, and increases the size of the volume by adding a storage device when at least any one of the performance measurement values falls below a corresponding performance threshold

17. The storage control apparatus according to claim 15, wherein the storage devices are disk apparatuses that read and write data from and to a disk medium, and the performance measurement values of the disk apparatuses include any one or combination of a read/write performance represented by a data transfer amount per unit time, a response time from reception of a command until an end response, a seek time from reception of a command to a movement of a head to a target track and then on-track, a rotation latency time of the disk from the on-track on the target track until a target sector's appearance on the head, and the number of times of errors within a predetermined period of time and a free space.

18. The storage control apparatus according to claim 15, wherein the performance improving unit sets a minimum performance threshold value in advance correspondingly to the performance measurement value, and increases the size of the volume by adding a storage device when the performance measurement value is equal to or smaller than the minimum performance threshold.

19. The storage control apparatus according to claim 15, wherein the performance improving unit finds a relative performance threshold by multiplying an average value of the performance measurement values of the plurality of storage devices by a relative performance rate, and increases the size of the volume by adding a storage device when the performance measurement value is equal to or smaller than the relative performance threshold.

20. The storage control apparatus according to claim 15, wherein when a storage device is added, the performance improving unit relocates a part of data written in an existing storage device to the additional storage device.

* * * * *

UNITED STATES PATENT AND TRADEMARK OFFICE
CERTIFICATE OF CORRECTION

PATENT NO. : 7,502,905 B2 Page 1 of 1
APPLICATION NO. : 11/214838
DATED : March 10, 2009
INVENTOR(S) : Satoshi Sonobe It is certified that error appears in the above-identified patent and that said Letters Patent is hereby corrected as shown below:

Column 13, Line 48, change "device" to --device.--.

Column 15, Line 16, change "threshold" to --threshold.--.

Signed and Sealed this

Nineteenth Day of May, 2009

JOHN DOLL
*Acting Director of the United States Patent and Trademark Office*